Dec. 18, 1934.  J. L. SPENCE, JR  1,984,847
FILM SAFETY CUT-OUT FOR MOVING PICTURE MACHINES
Filed Feb. 3, 1932
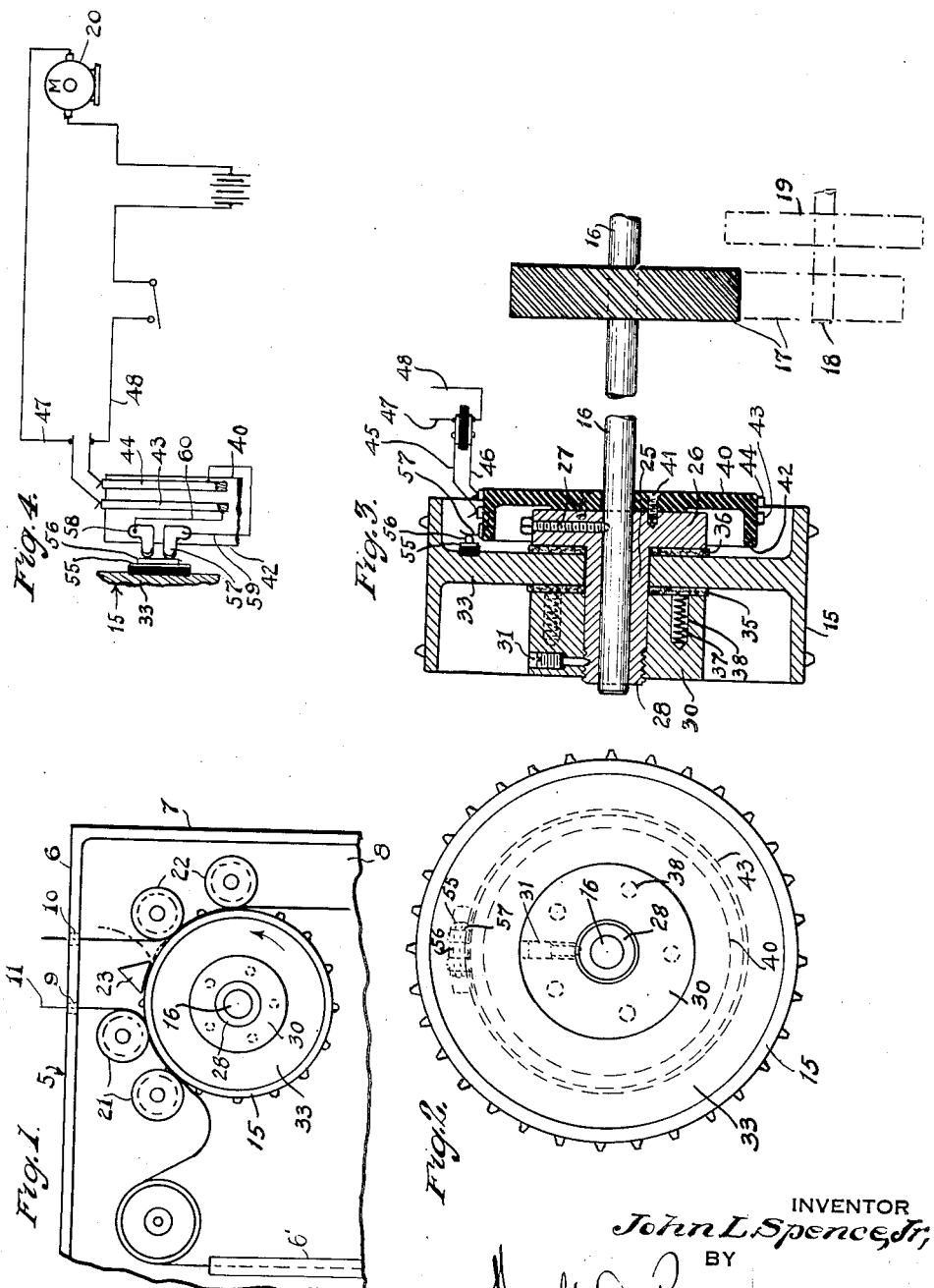
INVENTOR
John L. Spence, Jr,
BY
Harold D. Penney, ATTORNEY Patented Dec. 18, 1934

1,984,847

UNITED STATES PATENT OFFICE 1,984,847

FILM SAFETY CUT-OUT FOR MOVING PICTURE MACHINES

John L. Spence, Jr., New York, N. Y., assignor, by mesne assignments, to Remac Patents Corporation, New York, N. Y., a corporation of New York Application February 3, 1932, Serial No. 590,651

7 Claims. (Cl. 88—17)

This invention relates to feeding means and more particularly to means for feeding film in motion picture and sound machines.

One object of the invention is to provide means in apparatus or devices of this kind for preventing the breakage of film if the film should become caught or jammed in its travel.

Another object of the invention is to provide a yieldable releasing clutch for the feed sprocket, whereby excessive drag by the film releases the clutch before film breakage takes place.

Another object of the invention is to provide a clutch or device of this kind which opens the film-drive motor circuit when the excessive film drag or jamming takes place.

Other objects of the invention are to improve generally the simplicity and efficiency of such apparatus and to provide a device or apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved film feed mechanism which, briefly stated, includes a drive means including a motor and a feed shaft, the latter normally rotating a feed sprocket drum carried by a yieldable friction mounting or clutch interposed between the shaft and drum, to yieldably release the drum from the shaft, should the film jam, thereby to cause relative rotation between the drum and shaft, which rotation sets in operation a cut-out means for breaking the motor circuit and disabling the motor and drive means, thereby to stop the feeding of the film.

In the accompanying drawing showing, by way of example, one of many possible embodiments of the invention, Fig. 1 is a fragmental side elevation showing the interior of a camera with film feed means therein;

Fig. 2 is a side elevation of the feed sprocket;

Fig. 3 is a fragmental axial sectional view, partly in elevation, showing the friction clutch and drive gears; and Fig. 4 is a fragmental edge elevation partly in section showing the cut-out contacts.

This invention is shown in combination, with a camera 5 or other sound or film feed apparatus having a film-gate 6', and walls 6, 7, 8 including a top-wall 6 having openings 9 and 10 for film 11 from supply and take up reels (not shown).

A film feed sprocket-drum 15 is yieldably mounted on a feed shaft 16 driven by drive means 17, 18, 19 suitably driven by a motor 20 (Fig. 4). Pairs of advance and take-up idlers 21, 22 serve for holding and guiding the film on the drum as the film is advanced from the supply opening 9 to the film gate, the film finally passing upwardly to the rear of the drum to the idlers 22 and thence to the opening 10.

A stripper 23 of triangular cross section mounted above said drum between said pairs is provided for preventing broken film from passing from the take-up idlers 22 to the advance idlers 21.

The invention includes yieldable friction mounting means, later to be described, interposed between the shaft 16 and drum 15, to yieldably release the drum from the shaft, should the film jam under the stripper or elsewhere, thereby to cause relative rotation between the drum and shaft; and cut-out means set in operation by said relative motion is provided for breaking the motor circuit and disabling the motor 20 and drive means.

Said friction mounting means includes a bearing hub 25, 26 held fast on the shaft a set screw 27 and comprising a cylindrical bearing portion 25 threaded at one end 28 and having a deep flange 26 at the other. This cylindrical portion carries an adjustably collar 30 having a threaded bore adjustably held engaged with said threaded end by a set screw 31. The drum comprises an inner vertical web 33 having a center opening disposed on said portion 25 between said flange 26 and collar 30.

Adjacent faces of said web, flange and collar are smooth to provide friction faces between which are disposed fiber friction washers 35, 36, springs 37 in bores 38 pressing against the adjacent washer 35 for engaging said friction faces against the washers with sufficient force to cause rotation of the drum and film feed during normal operation.

The above mentioned cut-out means is carried on an insulating fiber disk 40 secured by screws 41 to the outer face of said flange 26 and has an inturned flange 42 carrying a pair of slip-rings 43, 44 on its outer periphery. Insulated brushes 45, 46 engage said slip rings respectively, and are connected by conductors 47, 48 in series with the circuit of the motor 20, as shown in Fig. 4.

A conducting bridge plate 55 mounted on and insulated from the drum web is formed with elongated contact block 56 substantially parallel to the adjacent portion of said flange and adapted to be engaged by spring contacts 57, 58 separately mounted on said flange 42 and electrically connected by conductors 59, 60 to said rings 44, 43 respectively. Said contacts are so positioned that at one relative position of the flange 42 and drum they engage said bridge block 56 and complete the motor circuit; but on slight relative rotation, at least one contact disengages from the bridge block, and breaks the motor circuit, thereby to stop the drum and film feed.

The operation is obvious from the foregoing. Should the film jam or for any reason drag excessively on the drum 15, the drum will be stopped or slowed while the shaft 16 and disk 40 continue to rotate, thus carrying at least one of contacts 57, 58 from the block 56, thus breaking the motor circuit and stopping film feed.

I claim as my invention:

1. In combination, a film drive means including a shaft, driving motor therefor and a motor circuit; a feed sprocket yieldably mounted on the shaft; and cut-out means including contacts in said circuit carried by said shaft and sprocket respectively and adapted to be disengaged by film actuated relative motion between said sprocket and shaft for disabling the motor circuit.

2. In combination, a feed shaft; drive means therefor including a motor and motor circuit, a drum yieldably mounted on the shaft; a yieldable mounting means interposed between the shaft and drum; and cut-out means set in operation by relative motion between the drum and shaft for breaking the motor circuit; said mounting means comprising a bearing hub fast on the shaft and rotatably supporting the drum; friction means interposed between said hub and drum; said cut out means comprising an insulating disk secured to the hub; slip-rings on the disk; brushes engaging said slip rings respectively, and connected in series with the motor circuit; and insulated from the drum; and spring contacts on said disk electrically connected to said rings respectively, and adapted, at one relative position of the disk and drum to engage said plate and complete the motor circuit.

3. An apparatus comprising a film feed apparatus having a film-gate, and walls including a top-wall having openings for film supply and take up reels; a feed shaft; drive means therefor including a motor and motor circuit; a main feed sprocket-drum yieldably mounted on the drum; pairs of advance and take-up idlers for holding and guiding the film on the drum; a stripper of triangular cross section mounted above said drum between said pairs for preventing film from passing from the take-up idlers to the advance idlers; yieldable friction mounting interposed between the shaft and drum, to yieldably release the drum from the shaft, should the film jam under the stripper or elsewhere, thereby to cause relative rotation between the drum and shaft; and cut-out means set in operation by said relative motion for breaking the motor circuit and disabling the motor and drive means.

4. In combination, a drive means including a shaft driving motor therefor and a circuit for the motor; a hub fast on said shaft and having a flange; a feed sprocket drum yieldably having a web rotatably mounted on the hub; and cut-out means set in operation by relative motion between said sprocket and shaft for disabling the motor circuit; said cut out means comprising an insulating fiber disk secured to the outer face of said flange and having an inturned flange; a pair of slip-rings on the outer periphery of the inturned flange; insulated brushes engaging said slip rings respectively, and connected in series with the motor circuit; a conducting bridge plate mounted on and insulated from the drum web and formed with elongated contact block substantially parallel to the adjacent portion of said periphery; and spring contacts separately mounted on said flange and electrically connected to said rings respectively, and adapted, at one relative position of the flange and drum to engage said drum and complete the motor circuit, and adapted on slight relative rotation, to disengage the bridge block, break the motor circuit and thereby stop the drum and film feed.

5. In combination, a film drive means including a shaft, a driving motor therefor and a motor circuit, a film feed sprocket mounted for relative movement on the shaft and circuit cut-out means including contacts in said circuit carried by said shaft and adapted to be disengaged by film actuated relative movement of said sprocket upon said shaft for disabling the motor circuit.

6. In a moving picture machine, means for preventing the breakage of the film, comprising, in combination, a film drive means including an electric circuit, a film feeding means frictionally connected to said drive means and operatively driven thereby and a circuit cut-out means between said film feeding means and said film drive means, said cut-out means being set into operation by excessive film drag to open the electric circuit to stop the film drive means before breakage of the film occurs.

7. In a moving picture machine, means for preventing the breakage of the film, comprising, in combination, a film drive means including an electric circuit, a film feeding means frictionally connected to said drive means and operatively driven thereby, means for adjusting said film feeding means frictionally to said drive means and a circuit cut-out means between said film feeding means and said film drive, said cut-out means being set into operation by excessive film drag to move the film feeding means relative to the film drive means to stop said latter means before breakage of the film occurs.

JOHN L. SPENCE, Jr.